(12) United States Patent
Nguyen et al.

(10) Patent No.: US 7,116,089 B1
(45) Date of Patent: Oct. 3, 2006

(54) CONSTANT-PEAK-CURRENT MINIMUM-OFF-TIME PULSE FREQUENCY MODULATOR FOR SWITCHING REGULATORS

(75) Inventors: James H. Nguyen, San Jose, CA (US); Thomas T. Chiang, San Jose, CA (US); Christopher T. Falvey, Fremont, CA (US)

(73) Assignee: Monolithic Power Systems, Inc., Los Gatos, CA (US)

( * ) Notice: Subject to any disclaimer, the term of this patent is extended or adjusted under 35 U.S.C. 154(b) by 0 days.

(21) Appl. No.: 11/261,874

(22) Filed: Oct. 28, 2005

(51) Int. Cl.
*G05F 1/613* (2006.01)

(52) U.S. Cl. ...................... 323/284; 323/285
(58) Field of Classification Search ........... 323/222, 323/223, 282, 284, 285, 351
See application file for complete search history.

(56) References Cited

U.S. PATENT DOCUMENTS 7,030,596 B1 * 4/2006 Salerno et al. ............. 323/282
7,061,213 B1 * 6/2006 Yoshida ..................... 323/224

* cited by examiner

*Primary Examiner*—Gary L Laxton
(74) *Attorney, Agent, or Firm*—Perkins Coie LLP

(57) ABSTRACT

Methods and apparatus are disclosed for controlling switching regulators to automatically switch from a traditional pulse-width modulation (PWM) mode, when the load current is higher than a predetermined value, to a pulse-frequency modulation (PFM) mode, when the load current drops to a point lower than the predetermine value. Switching modes increases the efficiency of the regulator when the load current is low without provoking a large output voltage transient. In some embodiments, a single switching cycle regulates the output in the PFM mode, which reduces the switching losses and enhances the efficiency of the regulator.

16 Claims, 7 Drawing Sheets

Simplified Schematic

Figure 1: Simplified Schematic

US 7,116,089 B1

CONSTANT-PEAK-CURRENT MINIMUM-OFF-TIME PULSE FREQUENCY MODULATOR FOR SWITCHING REGULATORS

TECHNICAL FIELD

The embodiments described below relate, in general, to switching regulators and, in particular, to controlling schemes for switching regulators during high and low load currents.

BACKGROUND

When higher efficiency, smaller size, lighter weight, and prolonging battery lifetime are required, switching regulators are used for power management as replacements for simpler linear regulators. Furthermore, while the linear regulators can only step down, the switching regulators can be configured to step up (boost), step down (buck), or invert the output voltage with respect to the input voltage. A switching regulator is basically a circuit for regulating the voltage across a load. It transfers energy from input to output in discrete packets and a feedback circuitry regulates the energy transfer to maintain a constant voltage within the load limits of the circuit. Portable devices often operate in low-power stand-by mode because increasing the efficiency significantly increases the battery life.

The popular control scheme for switching regulators is the pulse-width modulation (PWM). The control uses a constant switching frequency but varies the duty cycle as the load current varies. This scheme achieves good regulation, low noise spectrum, and high efficiency; however, when the load current is low the PWM mode is not efficient due to the switching loss and the high quiescent current.

DETAILED DESCRIPTION

Figure 1:
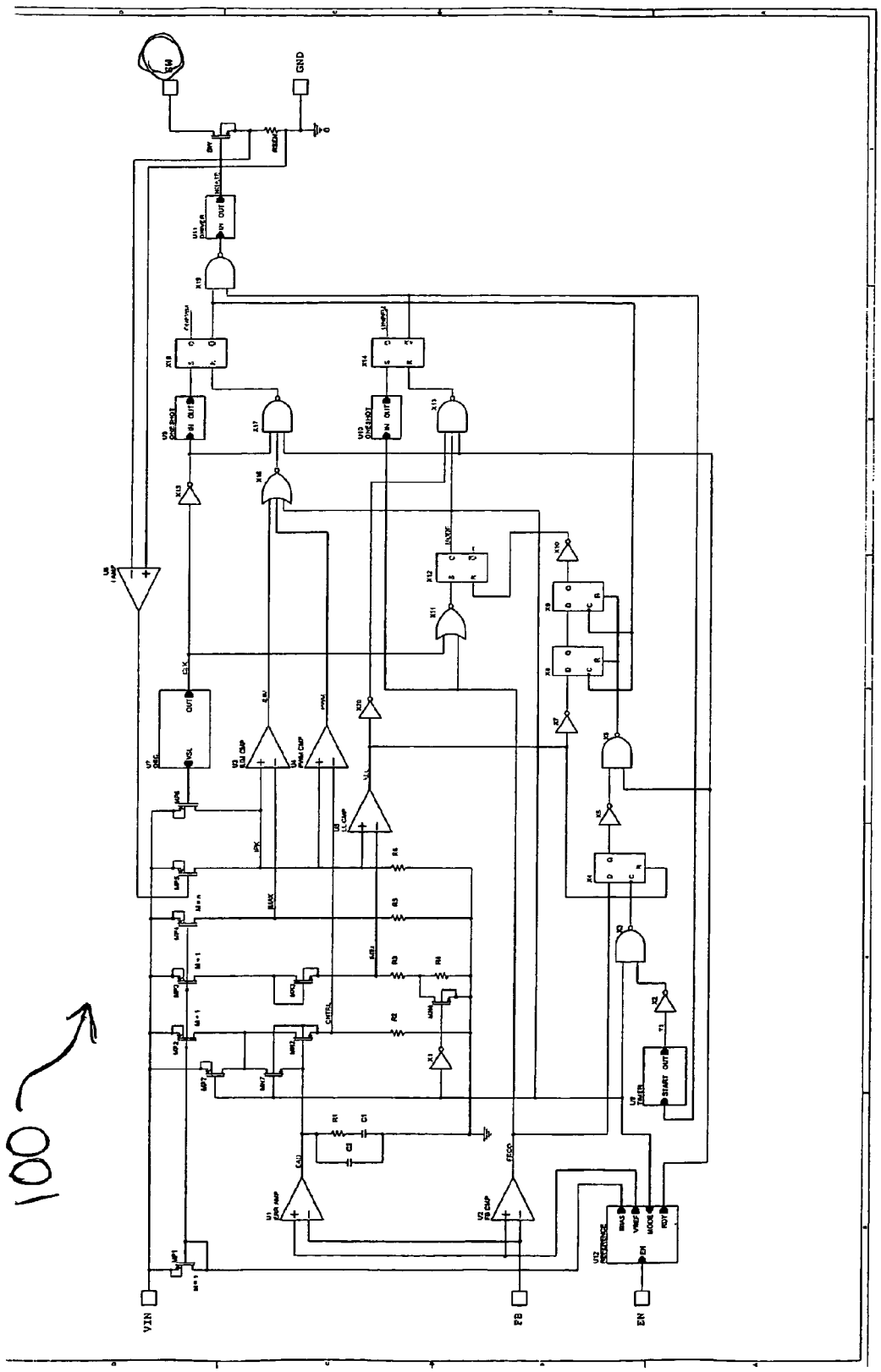
FIG. 1 shows a schematic diagram of a 5-pin boost converter to exemplify disclosed automatically adaptable switching regulators, in accordance with an embodiment of the invention.

Control of the switching regulators by PWM, when the load current is low (light load), is not efficient due to the switching loss and the high quiescent current. In such conditions, the pulse frequency modulation (PFM) mode is preferable. The disclosed embodiments describe methods and apparatus that automatically switch between the PWM mode and the PFM mode without provoking a large output voltage transient.

Switching regulators generally experience two kinds of losses: switching losses and conduction losses. While the output of a switching regulator feeds a light load, the regulator's efficiency can be enhanced by reducing the switching losses. In PFM mode, a switching regulator switches as many cycles as necessary to keep the output regulated. Once it achieves regulation, the switching stops until the output needs regulation again, at which time the switching cycles start again. In the existing art, a switching regulator has to switch several cycles before it stops switching. However, in the embodiments disclosed here, a single switching cycle can regulate the output. By having only a single pulse in PFM mode, the switching losses are reduced, which enhances the efficiency of the regulator.

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

The description of the embodiments of the invention and their applications as set forth herein is illustrative and is not intended to limit the scope of the invention. Variations and modifications of the embodiments are possible and practical alternatives to, or equivalents of the various elements of, the embodiments disclosed herein and are known to those of ordinary skill in the art. Such variations and modifications of the disclosed embodiments may be made without departing from the scope and spirit of the invention.

In the disclosed embodiments, when the load current is high, a traditional peak-current constant-frequency scheme is used in a PWM mode. When the load current drops to or below a predetermine value, the controller enters constant-peak-current minimum-off-time PFM mode, where the switching frequency is lower, resulting in higher efficiency and lower switching loss. Also, the quiescent current consumption is significantly reduced for better standby performance. Another advantage of this scheme is that there is no pulse group at PFM that leads to lower output ripple.

Figure 2:
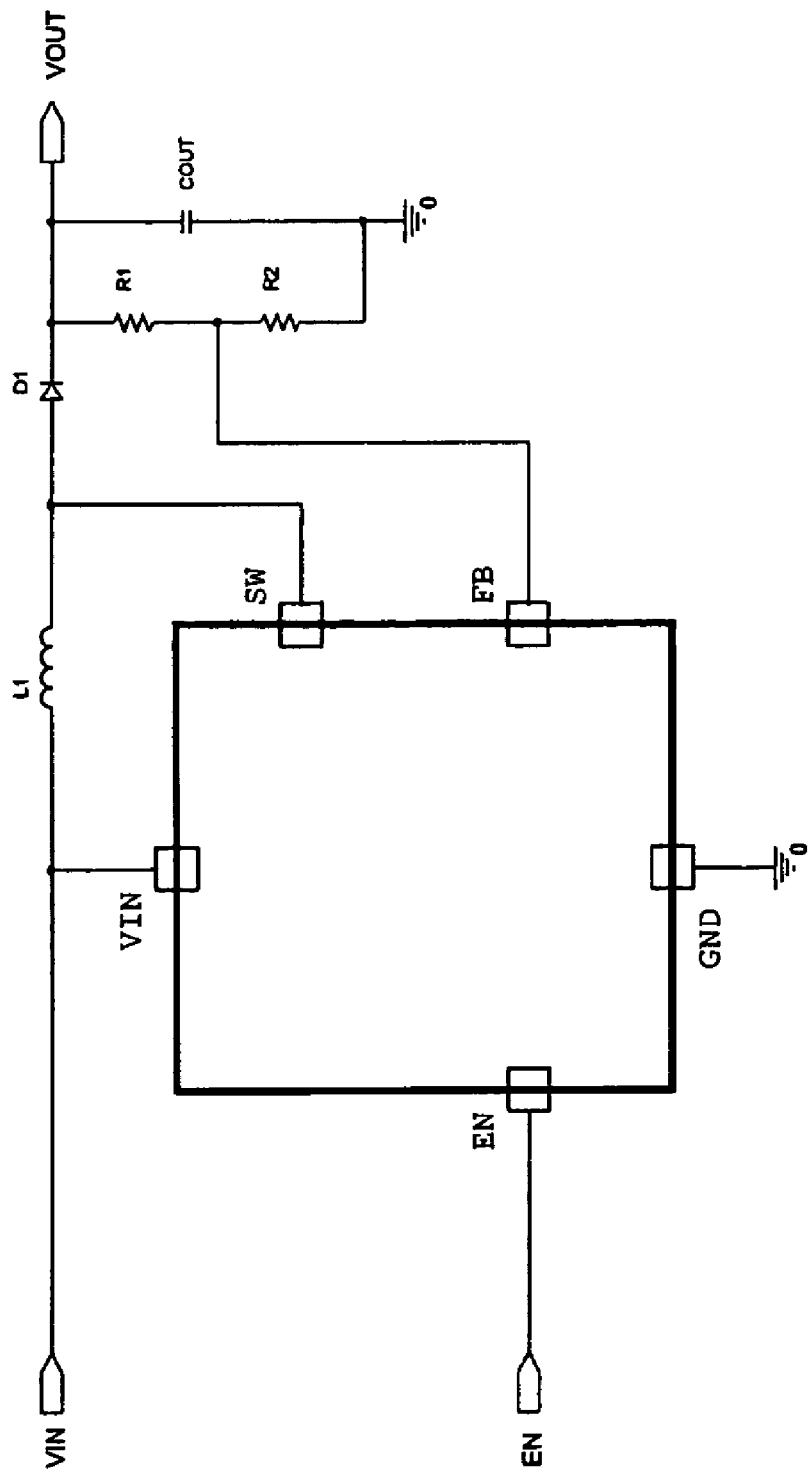
FIG. 2 shows an application of the 5-pin boost converter along with external components and arrangements.

FIG. 1 shows a simplified schematic diagram of an embodiment of the invention. A 5-pin boost converter 100 is employed in this embodiment for illustration purposes. The controller part comprises a reference block U12, an error amplifier U1, a loop compensation network R1, C1, and C2, a PWM comparator U4, a current limit comparator U3, a light load comparator U5, a current sense amplifier U6, a feedback comparator U2, a timer U8, an oscillator U7, a driver U11, and an N-channel power MOSFET, SW. FIG. 2 shows an exemplary application of the 5-pin boost converter along with external components and connections.

PWM Mode

Operating in PWM mode, the error amplifier U1 regulates the output voltage by monitoring the FB pin voltage, which receives some specified portion of the output voltage $V_{OUT}$, and compares it to an internal reference voltage $V_{REF}$ to generate the control voltage $V_{CONTRL}$ by transistor MN2. At the beginning of each clock cycle, RS-flip-flop X18 is set and the N-channel switch SW turns on, forcing the inductor L1 current to rise. The current at the sense resistor RSEN is amplified by current sense amplifier U6 and converted to voltage $V_{IPK}$ by MP5 and R6. $V_{IPK}$ is then compared to $V_{CONTROL}$ by PWM comparator U4. When inductor L1 current rises sufficiently, which makes $V_{IPK}$ equal to $V_{CONTROL}$, the PWM comparator U4 goes high to reset RS-flip-flop X18 and turns off the N-channel switch SW, forcing the inductor L1 current to the output capacitor though an external rectified diode D1.

The control voltage $V_{CONTROL}$ rises up or falls down to control the peak inductor L1 current, which in turn is controlled by the output voltage $V_{OUT}$. Thus, the output voltage $V_{OUT}$ controls the inductor L1 current to satisfy the load. MP6 generates slope compensation current when the duty cycle is greater than 40%. MP4 and R5 set the IMAX voltage $V_{IMAX}$ threshold for the current limit comparator U3 to limit the peak current.

PFM Mode

Operating in PFM mode, the error amplifier U1, the PWM comparator U4, the current limit comparator U3, and the oscillator U7 are disabled to lower the quiescent current. The controller runs in discontinuous conduction mode (DCM) with constant peak current and variable off-time. Feedback comparator U2 compares output voltage $V_{OUT}$ via the FB pin to internal reference voltage $V_{REF}$. When $V_{OUT}<V_{REF}$, the RS-flip-flop X14 is set and the N-channel SW turns on, forcing the inductor L1 current to rise.

The current at the sense resistor RSEN is amplified by current sense amplifier U6 and converted to voltage $V_{IPK}$ by MP5 and R6. $V_{IPK}$ is compared to $V_{IMIN}$ at the connection of MN3 and R3 by light load comparator U5. When the inductor L1 current rises to a predetermined value (normally set to 10–20% of maximum peak current), which makes $V_{IPK}$ equal to $V_{IMIN}$, the light load comparator U5 goes high to reset the RS-flip-flop X14 and turns off the N-channel switch SW, forcing inductor L1 current to charge up the output voltage $V_{OUT}$ through an external rectified diode.

The control keeps idling until the FB voltage $V_{FB}$ drops to $V_{REF}$. The switching frequency is proportional to the load current, thus the switching loss is reduced. During each switching cycle, the controller only generates one "on" pulse to send a fixed amount of inductor L1 energy to the output. Therefore, the output voltage $V_{OUT}$ ripple is much smaller compared to the burst mode architecture.

Mode Transition

Figure 3:
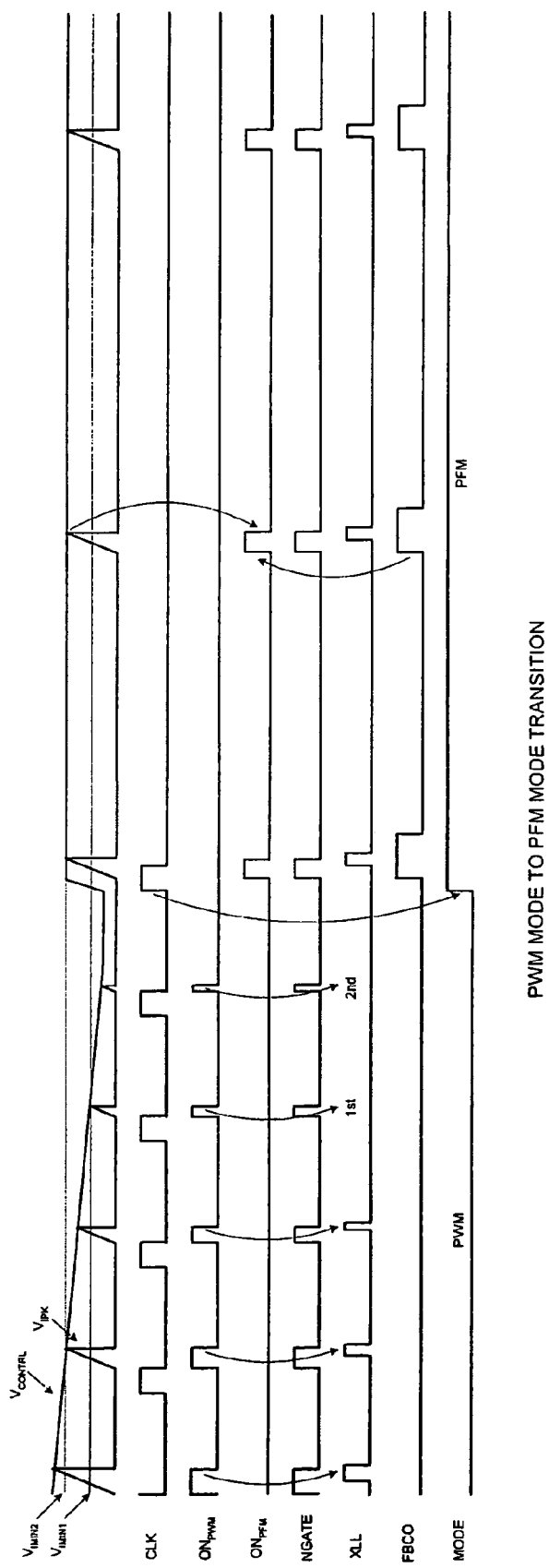
FIG. 3 shows some key waveforms during a transition from PWM to PFM mode.

Disclosed embodiments provide a transition between modes that minimizes the output voltage $V_{OUT}$ transient. FIG. 3 shows some of the key waveforms during a transition from PWM mode to PFM. At the end of every "on" cycle, the controller monitors the peak current through the light load comparator U5. If the peak current is lower than the preset value ($V_{IPK}<V_{IMIN}$) for two consecutive cycles, and the output voltage $V_{OUT}$ is higher than a target value, which is decided by feedback comparator U2, then an active high of CLK will set the RS-flip-flop X12. This results in MODE=1 and in switching to PFM mode.

Two processes take place when MODE=1. First, as MN4 turns off, $V_{IMIN}$ is switched from $V_{IMIN1}$ to a higher voltage $V_{IMIN2}$, which results in a higher peak current than the controller is demanding and a reduction of the switching frequency in PFM mode. Second, the error amplifier U1 output $V_{EAO}$ is tri-stated and is clamped to MN2 gate voltage, which has gate and drain connected to the current source MP2. Note that when MODE=1, MP7 is "off" and MN7 is "on". In this situation, because MP2=MP3, MN2=MN3, and R2=R3+R4, then $V_{CNTRL}=V_{IMIN}=V_{IMIN2}$.

Therefore, when the controller switches back to PWM mode, the error amplifier U1 output $V_{EAO}$ is close to the controlled value.

Figure 4:
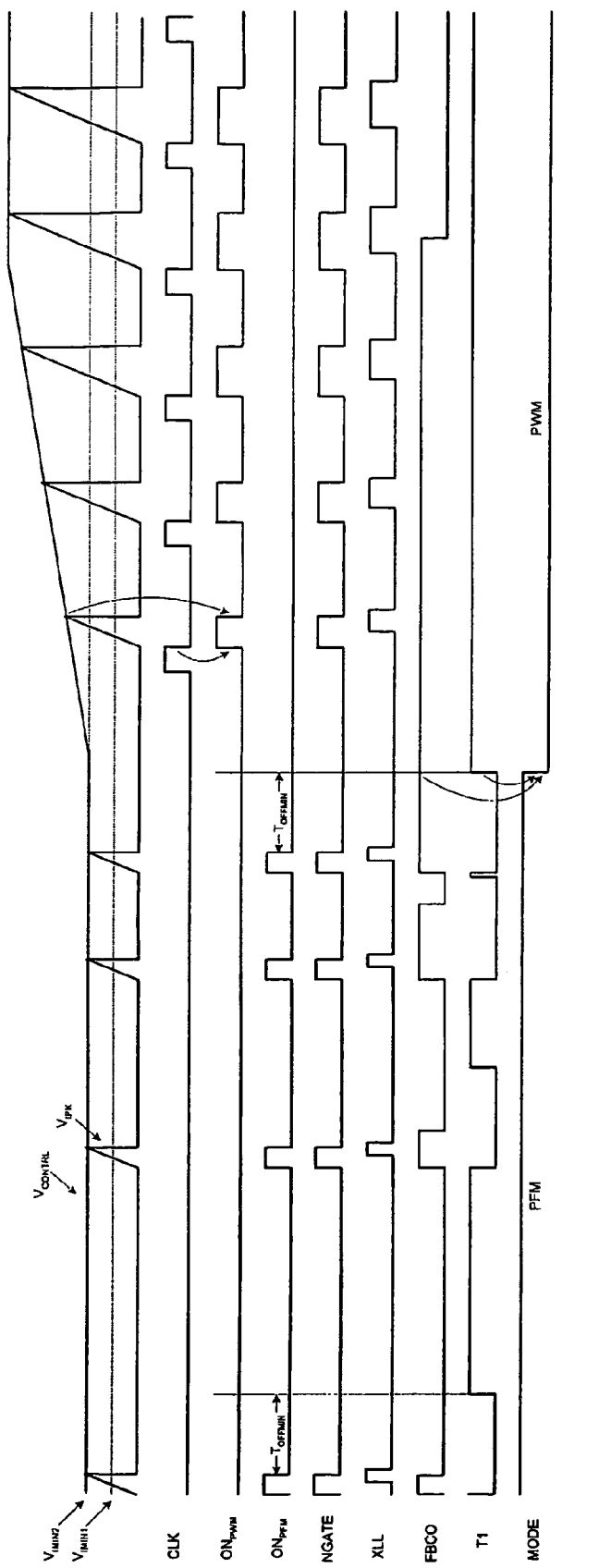
FIG. 4 shows some key waveforms during a transition from PFM to PWM mode.

FIG. 4 shows a transition from PFM to PWM mode. At the end of every "on" cycle, the timer U8 starts and ends with T1=1 to indicate a minimum "off" time. If the output voltage $V_{OUT}$ is still less than the target value, which is determined by the feedback comparator U2 when T1=1, then output Q of D-flip-flop X4 goes high to reset the RS-flip-flop X12, which results in MODE=0 and in switching back to the PWM mode.

Figure 5:
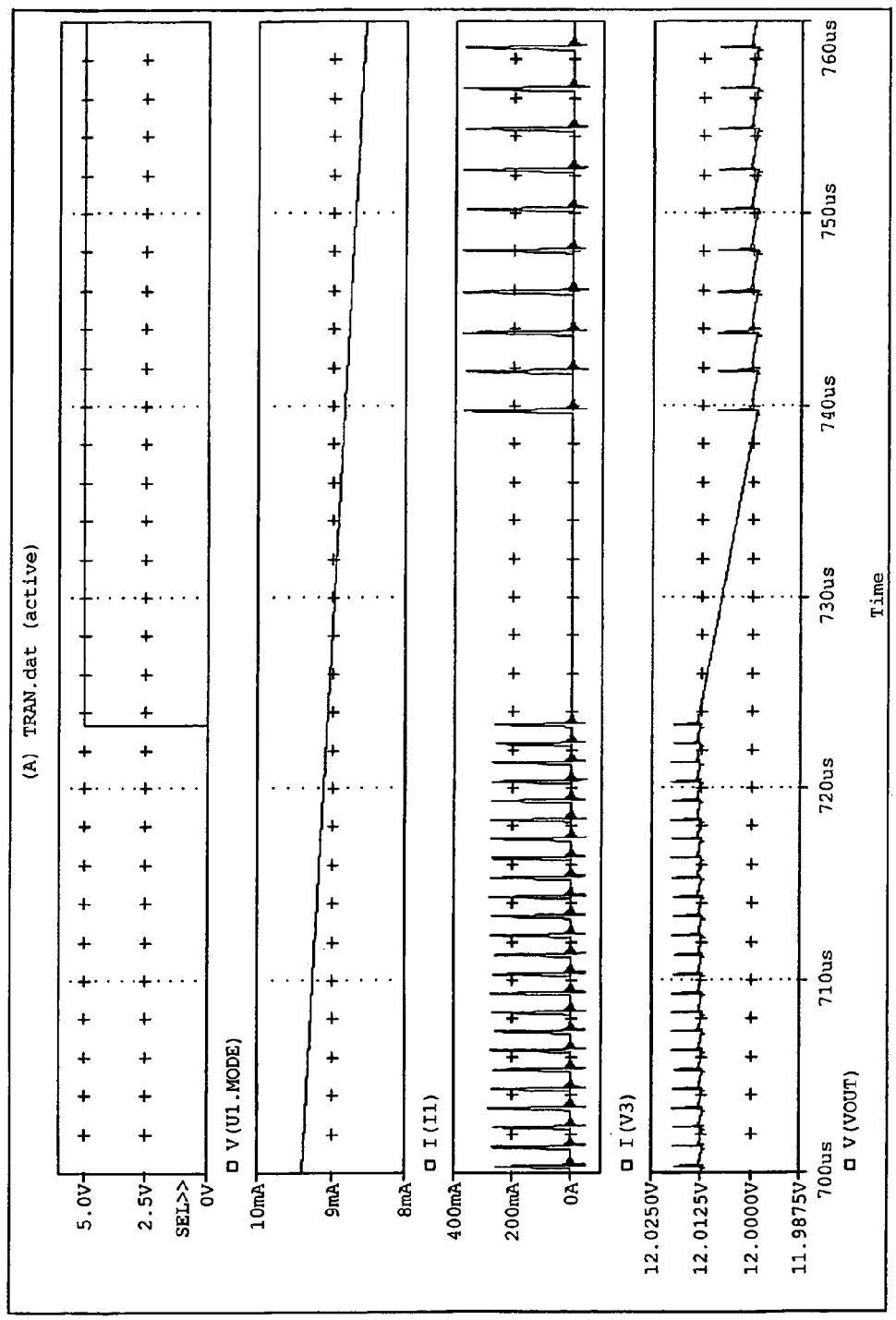
FIGS. 5 and 6 illustrate simulation results of a transition from PWM to PFM mode and a transition from PFM to PWM mode, respectively.
Figure 6:
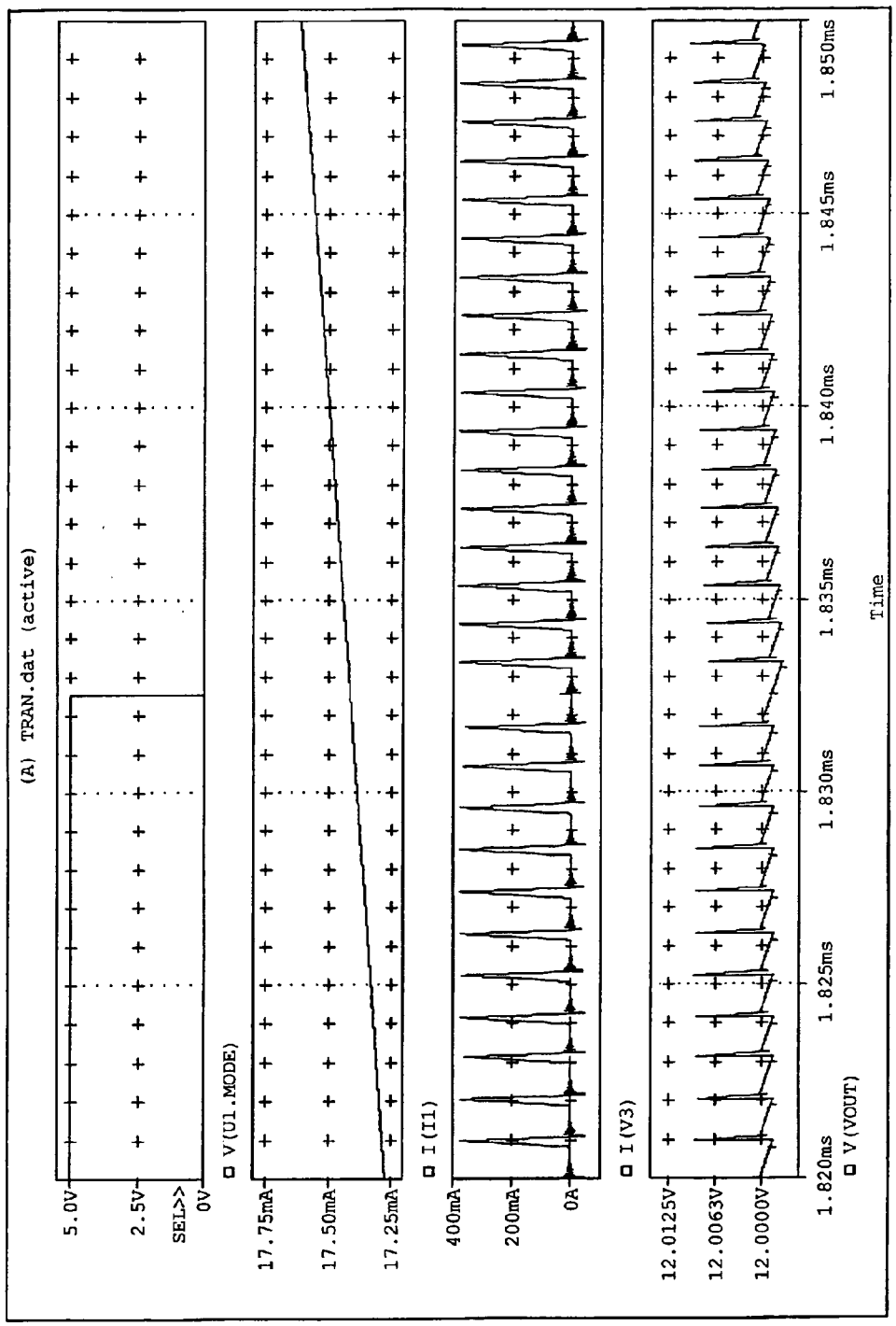

FIGS. 5 and 6 show simulations of the transitions from PWM to PFM mode and from PFM to PWM mode, respectively. Top trace is the MODE, below the MODE is the load current, and the third trace is the inductor L1 current. The output voltage is depicted by the bottom trace. When the load current drops to 9 mA, for example, the controller switches to PFM mode and switches back to PWM mode when the load current crosses 17 mA.

Figure 7:
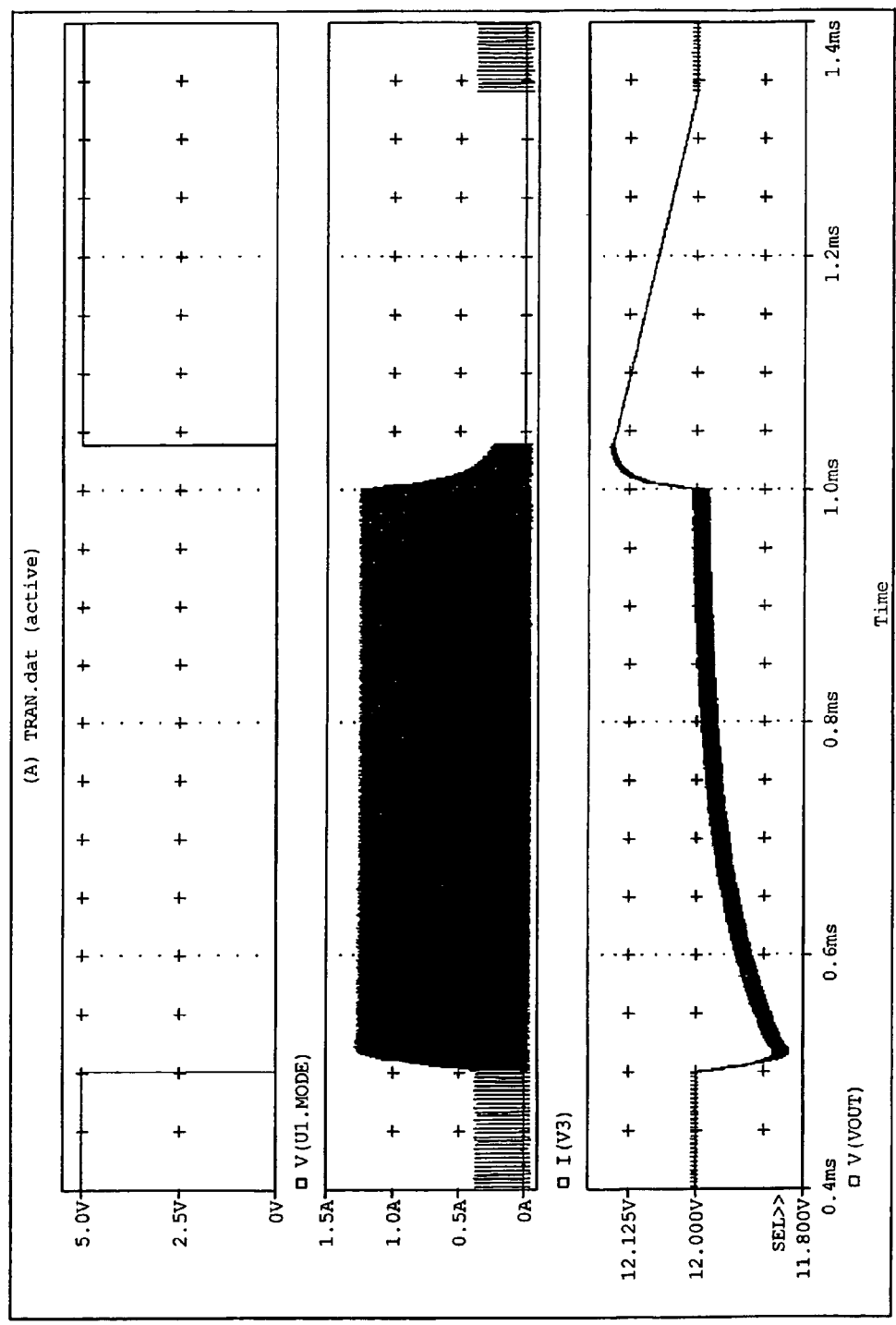
FIG. 7 shows transient effects of a load current changing from 5 mA to 200 mA and back to 5 mA.

FIG. 7 shows some signal transitions as the load current changes from 5 mA to 200 mA and back to 5 mA. In this Figure, the top trace is the MODE, the middle trace is the inductor L1 current, and the bottom trace is the output voltage. The MODE trace starts with the PFM mode and transitions into PWM mode before returning to PFM mode.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof.

Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize.

The teachings of the invention provided herein can be applied to other systems, not necessarily the system described above. The elements and acts of the various embodiments described above can be combined to provide further embodiments.

Changes can be made to the invention in light of the above Detailed Description. While the above description describes certain embodiments of the invention, and describes the best mode contemplated, no matter how detailed the above appears in text, the invention can be practiced in many ways. Details of the compensation system described above may vary considerably in its implementation details, while still being encompassed by the invention disclosed herein.

As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A switching regulator for controlling an output voltage configured to feed a load, wherein the switching regulator operates in pulse-width modulation (PWM) mode when the load current is higher than a predetermined value and operates in pulse-frequency modulation (PFM) mode when the load current is lower than the predetermined value, the switching regulator comprising:
   an input voltage port for supplying input voltage $V_{IN}$ to the switching regulator;
   an output voltage port for providing a regulated output voltage $V_{OUT}$ to the load;
   a switch SW, connected to the output voltage port for turning the output voltage on and off, wherein SW is partly controlled by a feedback signal representing $V_{OUT}$;
   a feedback port FB to which a predetermined portion of the output voltage $V_{OUT}(V_{FB})$ is connected;
   an inductor L, connected between the input voltage port and the output voltage port;
   a clock pulse generator;
   an error amplifier;
   a PWM comparator;
   a feedback comparator;
   a light-load comparator; and
   a configuration wherein:
      in PWM mode, at the beginning of each clock cycle switch SW is turned on to increase a current in the inductor L ($I_L$) which is converted to a voltage $V_{IPK}$ and is compared to a control voltage $V_{CONTRL}$ by the PWM comparator to turn off switch SW when $V_{IPK}=V_{CONTROL}$, wherein $V_{CONTROL}$ is generated by comparing $V_{FB}$ to an internal reference voltage $V_{REF}$ using the error amplifier; and
      in PFM mode, the feedback comparator compares $V_{OUT}$, using $V_{FB}$, to $V_{REF}$ and if $V_{OUT}<V_{REF}$, SW is turned on forcing $I_L$ to rise, where $I_L$ is converted to the voltage $V_{IPK}$ and is compared to a first reference voltage $V_{IMIN}$ by the light-load comparator and if $V_{IPK}=V_{IMIN}$ SW is turned off forcing $I_L$ to charge up the output voltage $V_{OUT}$ and wherein $V_{IMIN}$ is a predetermined voltage, and wherein the switching regulator keeps idling until $V_{FB}$ drops to $V_{REF}$.

2. The switching regulator of claim 1, wherein switching frequency is proportional to the load current and during each switching cycle only one "on" pulse is generated to send a fixed amount of inductor L energy to output.

3. The switching regulator of claim 1, wherein a transistor generates slope compensation current when duty cycle is greater than about 40% and a combination of transistor and resistor limit a peak inductor L current.

4. The switching regulator of claim 1, wherein in the PWM mode, at the beginning of each clock cycle an RS-flip-flop is set to turn on an N-channel switch SW, and wherein $I_L$ is converted to $V_{IPK}$ by a combination of a transistor and a resistor, and wherein when $I_L$ rises sufficiently and makes $V_{IPK}$ equal to $V_{CONTROL}$, the RS-flip-flop is reset to turn off the N-channel switch SW.

5. The switching regulator of claim 1, wherein in the PFM mode, the error amplifier and the PWM comparator are disabled to lower a quiescent current and when $V_{OUT}<V_{REF}$, an RS-flip-flop is set to turn on an N-channel SW and when $V_{OUT}=V_{REF}$, the RS-flip-flop is reset to turn off an N-channel SW.

6. The switching regulator of claim 1, wherein if $V_{IPK}<V_{IMIN}$ for two consecutive cycles, and the output voltage $V_{OUT}$ is higher than a target value, the mode switches from PWM to PFM.

7. The switching regulator of claim 1, wherein a timer keeps track of a minimum "off" time and wherein if the output voltage $V_{OUT}$ is still less than a target value, the mode switches from PFM to PWM.

8. An apparatus for regulating an output voltage $V_{OUT}$, wherein the apparatus operates in pulse-width modulation (PWM) mode when a load current is higher than a predetermined value and in pulse-frequency modulation (PFM) mode when the load current is lower than the predetermined value, the apparatus comprising:
   means for switching $V_{OUT}$ "on" or "off", wherein the switching means is partly controlled by a feedback signal representing $V_{OUT}$;
   means for feeding back a portion of the output voltage $V_{OUT}(V_{FB})$;
   an inductor L, connected between an input-voltage port and an output-voltage port;
   means for generating clock pulses;
   means for amplifying voltages;
   means for converting current to voltage;
   means for comparing voltages; and
   a configuration wherein:
      in PWM mode, at the beginning of each clock cycle the switching means is turned on to increase a current in the inductor L ($I_L$) which is amplified by the amplifying means, converted to a voltage $V_{IPK}$ by the current to voltage converting means, and is compared to a control voltage $V_{CONTRL}$ by the voltage comparing means to turn off the switching means once $V_{IPK}=V_{CONTROL}$, wherein $V_{CONTROL}$ is generated by comparing $V_{FB}$ to an internal reference voltage $V_{REF}$; and
      in PFM mode, using $V_{FB}$, $V_{OUT}$ is compared to $V_{REF}$ and if $V_{OUT}<V_{REF}$, the switching means is turned on forcing $I_L$ to rise where $I_L$ is amplified, converted to the voltage $V_{IPK}$, and is compared to a first reference voltage $V_{IMIN}$ and if $V_{IPK}=V_{IMIN}$, the switching means is turned off forcing $I_L$ to charge up the output voltage $V_{OUT}$ and wherein $V_{IMIN}$ is a predetermined voltage.

9. The apparatus of claim 8, wherein the apparatus idles until $V_{FB}$ drops to $V_{REF}$ and wherein switching frequency is proportional to the load current and during each switching cycle only one "on" pulse is generated to send a fixed amount of inductor L energy to output.

10. A switching regulator method for controlling an output voltage $V_{OUT}$, wherein $V_{OUT}$ is regulated by pulse-width modulation (PWM) when a load current is higher than a predetermined value and by pulse-frequency modulation (PFM) when the load current is lower than the predetermined value, the method comprising:
providing an input-voltage $V_{IN}$ as an energy source to be regulated;
regulating $V_{OUT}$ by switching $V_{OUT}$ on and off, using a switch SW;
feeding back a predetermined portion of $V_{OUT}(V_{FB})$ to at least partly control switch SW;
connecting an inductor L or an equivalent circuit element between input and output;
if the load current is less than a predetermined value:
turning on switch SW at the beginning of each clock cycle to increase a current in the inductor L ($I_L$);
converting $I_L$ to a voltage $V_{IPK}$;
generating a control voltage $V_{CONTRL}$ by comparing $V_{FB}$ to an internal reference voltage $V_{REF}$;
comparing $V_{IPK}$ to the control voltage $V_{CONTRL}$; and turning off switch SW once $V_{IPK}=V_{CONTROL}$; and
if the load current is more than a predetermined value:
comparing $V_{OUT}$ to $V_{REF}$, using $V_{FB}$; and turning on SW to force $I_L$ to rise if $V_{OUT}<V_{REF}$;
converting $I_L$ to the voltage $V_{IPK}$; and
comparing $V_{IPK}$ to the first reference voltage $V_{IMIN}$ and turn off SW to force $I_L$ to charge up the output voltage $V_{OUT}$ if $V_{IPK}=V_{IMIN}$, and wherein the switching regulator keeps idling until $V_{FB}$ drops to $V_{REF}$ and wherein $V_{IMIN}$ is a predetermined voltage.

11. The method of claim 10, wherein switching frequency is proportional to the load current and during each switching cycle only one "on" pulse is generated to send a fixed amount of inductor L energy to output.

12. The method of claim 10, wherein a transistor generates slope compensation current when duty cycle is greater than about 40% and a combination of transistor and resistor limit a peak inductor L current.

13. The method of claim 10, wherein in the PWM mode, at the beginning of each clock cycle a flip-flop is set to turn on SW, and wherein $I_L$ is converted to $V_{IPK}$ by a combination of a transistor and a resistor, and wherein when $I_L$ rises sufficiently and makes $V_{IPK}$ equal to $V_{CONTROL}$, the flip-flop is reset to turn off SW.

14. The method of claim 10, wherein when $V_{OUT}<V_{REF}$, a flip-flop is set to turn on SW and when $V_{OUT}=V_{REF}$, the flip-flop is reset to turn off SW.

15. The method of claim 10, wherein if $V_{IPK}<V_{IMIN}$ for two consecutive cycles, and the output voltage $V_{OUT}$ is higher than a target value, the mode switches from PWM to PFM.

16. The method of claim 10, wherein a timer keeps track of a minimum "off" time and wherein if the output voltage $V_{OUT}$ is still less than a target value, the mode switches from PFM to PWM.

* * * * *